United States Patent
Hirata (10) Patent No.: US 7,643,208 B2
(45) Date of Patent: Jan. 5, 2010

(54) OPTICAL SCANNING OBSERVATION APPARATUS

(75) Inventor: Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/948,368

(22) Filed: Nov. 30, 2007

(65) Prior Publication Data

US 2008/0225388 A1 Sep. 18, 2008

(30) Foreign Application Priority Data

Mar. 13, 2007 (JP) .............................. 2007-063822

(51) Int. Cl.
*G02B 21/06* (2006.01)
(52) U.S. Cl. ..................................................... 359/379
(58) Field of Classification Search ................. 359/368, 359/379, 389
See application file for complete search history.

(56) References Cited

U.S. PATENT DOCUMENTS

| | | | | |
|---|---|---|---|---|
| 5,521,755 | A * | 5/1996 | Stankewitz | 359/385 |
| 6,094,300 | A * | 7/2000 | Kashima et al. | 359/385 |
| 6,285,019 | B1 * | 9/2001 | Engelhardt et al. | 250/216 |
| 6,307,690 | B1 * | 10/2001 | Czarnetzki et al. | 359/837 |
| 2005/0046935 | A1 | 3/2005 | Tanaami | |
| 2005/0046936 | A1 | 3/2005 | Dixon et al. | |
| 2005/0179903 | A1* | 8/2005 | Tsuruta et al. | 356/445 |
| 2005/0200947 | A1* | 9/2005 | Hirata et al. | 359/368 |
| 2006/0098213 | A1 | 5/2006 | Itoh et al. | |
| 2006/0237666 | A1 | 10/2006 | Kubo | |
| 2008/0186551 | A1 | 8/2008 | Hanft et al. | |

FOREIGN PATENT DOCUMENTS

| | | |
|---|---|---|
| DE | 102005006239 A1 | 8/2006 |
| DE | 102005013949 A1 | 9/2006 |
| JP | 2004317676 | 11/2001 |
| JP | 2005202338 | 7/2005 |
| JP | 2005300278 | 10/2005 |
| JP | 2006079000 | 3/2006 |
| WO | WO 0244791 A1 * | 6/2002 |

OTHER PUBLICATIONS

Extended European Search Report, dtd Jul. 10, 2008, in corresponding foreign application, 9 pp.

\* cited by examiner

*Primary Examiner*—Alessandro Amari
*Assistant Examiner*—Mark Consilvio
(74) *Attorney, Agent, or Firm*—Pillsbury Winthrop Shaw Pittman, LLP (57) ABSTRACT

An optical scanning observation apparatus having an internal focusing mechanism, suitable for in-vivo observation of animals, is provided. The optical scanning observation apparatus includes a light source, an objective optical system for focusing light onto the sample, a detection-light splitting device for splitting off collected detection light, a detector for detecting the focused detection light, a focus scanning device disposed between the detection-light splitting device and the objective optical system, and a lateral-direction scanning device, disposed between the focus scanning device and the objective optical system, for scanning the light in orthogonal directions relative to the optical axis. The focus scanning device further includes a focusing optical system having a positive and negative lens group and a lens driving device for moving one lens group to adjust the working distance of the objective optical system.

3 Claims, 5 Drawing Sheets

OPTICAL SCANNING OBSERVATION APPARATUS

BACKGROUND OF THE INVENTION

1. Field of the Invention

The present invention relates to an optical scanning observation apparatus.

This application is based on Japanese Patent Application No. 2007-063822, the content of which is incorporated herein by reference.

2. Description of Related Art

Known laser-scanning microscopes in the related art transmit excitation light and detection light, for in vivo observation of an animal or the like, using a single optical fiber (for example, see Japanese Unexamined Patent Application, Publication No. 2005-300278 and Japanese Unexamined Patent Application, Publication No. 2006-79000). These laser-scanning microscopes employ a structure in which a collimator optical system between the fiber and a scanning mirror (an internal focusing mechanism) is driven to change the working distance, without changing the relative distance between an objective lens and a sample. With these laser-scanning microscopes, the tip of the objective lens can be brought into close contact with the sample to reduce the effects of breathing and pulsating of the animal. They are therefore optical scanning microscope systems designed for observation of animals.

On the other hand, configurations have also been disclosed in which the light path for excitation (excitation fiber) and the light path for detection (detection fiber) are separated to improve the signal-to-noise (SN) ratio (for example, see Japanese Unexamined Patent Application, Publication No. 2005-202338).

In addition, some known microscopes use an internal focusing mechanism (for example, see Japanese Unexamined Patent Application, Publication No. 2004-317676). Laser light is focused by a positive lens, is returned to a collimated beam with another positive lens, and is radiated onto a sample via a deflection mirror, a beam expander, and an objective lens. Fluorescence from the sample travels along the reverse light path, is split off from the laser light by a dichroic mirror, and after passing through a focusing lens and a pinhole, is detected by a detector. The working distance (WD) is changed by moving the positive lens. In this case, the optical system for changing the focus position is of the Keppler type. By combining Japanese Unexamined Patent Applications, Publication Nos. 2005-202338 and 2004-317676, it is possible to realize a microscope having an internal focusing mechanism with a high SN ratio.

However, with the configuration in Japanese Unexamined Patent Application, Publication No. 2004-317676, it is necessary to temporarily focus the light between the two lenses. Theoretically, it is possible to reduce the focal lengths of the positive lenses to reduce the overall length, but the change in position of the lenses then becomes small in relation to the change in focal position at the sample as the focal lengths are reduced. As a result, positional control becomes more difficult. Furthermore, because the numerical aperture (NA) between the two groups of positive lenses becomes large, aberration correction becomes difficult.

For these reasons, a long focal length is unavoidable. As a result, when combining the technologies in Japanese Unexamined Patent Applications, Publication Nos. 2005-202338 and 2004-317676, the overall length of the focusing optical system unavoidably increases, resulting in the drawback that the observation apparatus (microscope) increases in size, making it unsuitable for in vivo observation of animals.

BRIEF SUMMARY OF THE INVENTION

The present invention has been conceived in light of the circumstances described above, and an object thereof is to provide a compact optical scanning observation apparatus which has an internal focusing mechanism and which is suitable for in vivo observation of animals.

To realize the objects described above, the present invention provides the following solutions.

The present invention provides an optical scanning observation apparatus including a light source configured to emit illumination light for illuminating a sample; an objective optical system configured to focus illumination light from the light source onto the sample; a detection-light splitting device configured to split off, from the illumination light, detection light emitted from the sample and collected by the objective optical system; a detection-light focusing optical system configured to focus the detection light split off by the detection-light splitting device; a detector configured to detect the detection light focused by the detection-light focusing optical system; a focus scanning device disposed between the detection-light splitting device and the objective optical system; and a transverse-direction scanning device disposed between the focus scanning device and the objective optical system and configured to scan the illumination light from the light source on the sample, in substantially orthogonal directions with respect to the optical axis, wherein the focus scanning device includes a focusing optical system formed of at least a positive lens group and a negative lens group, and a lens driving device configured to move at least one lens group included in the focusing optical system to change a working distance of the objective optical system.

According to the present invention, because it is not necessary to temporarily focus the light inside the focusing optical system, the length of the focusing optical system can be reduced. It is thus possible to provide a compact optical scanning observation apparatus which has an internal focusing mechanism and which is suitable for in vivo examination of an animal.

In the present invention described above, the positive lens group and the negative lens group may be driven close to a positional relationship in which the overall focusing optical system forms an afocal optical system.

With this configuration, it is possible to improve the linearity between the observation position and the amount of movement of the focusing lens.

In the present invention described above, when a side of the focusing optical system closer to the transverse-direction scanning device is defined as a front side, a front focal point of the front-side lens group may be located in the vicinity of the transverse-direction scanning device.

With this configuration, it is possible to improve the linearity between the observation position and the amount of movement of the focusing lens.

In the present invention described above, the positive lens group may be disposed closer towards the front side than the negative lens group.

With this configuration the front focal point of the positive lens group can be located on the front side of the positive lens group and can be made to match the transverse-direction scanning device In the present invention described above, the negative lens group may be driven.

With this configuration, it is possible to improve the linearity between the observation position and the amount of movement of the focusing lens.

In the present invention described above, an absolute value of a focal length of the positive lens group may be larger than an absolute value of a focal length of the negative lens group.

With this configuration, the detection-light focusing optical system can be reduced in size. Thus, it is possible to provide a compact optical scanning observation apparatus which has an internal focusing mechanism and which is suitable for in vivo examination of an animal.

In the present invention described above, absolute values of focal lengths of the positive lens group and the negative lens group may be substantially the same.

With this configuration, because the diameters of the beams entering and exiting the focusing optical system are substantially the same, the focus scanning device can be freely inserted and removed, and it is thus possible to easily convert an optical scanning observation apparatus having no internal focusing mechanism to an apparatus having an internal focusing mechanism.

In the present invention described above, the negative lens group may include, from a side closer to the positive lens group, a negative lens subgroup and a positive lens subgroup having lower power than the negative lens subgroup.

With this configuration, because the principal point at the front side of the negative lens group is extended outward from the negative lens subgroup, the front principal point of the negative lens group and the back principal point of the positive lens subgroup can be made coincident, thus forming an afocal optical system. Accordingly, the lenses can be driven close to positions where they form an afocal optical system without interfering with each other.

In the present invention described above, when the transverse-direction scanning device side of the focusing optical system is defined as a front side, the positive lens group may be a lens combining a meniscus lens having a convex surface at the front side with a biconvex lens; a front-most lens of the negative lens group may be a negative lens having a concave surface facing the front side; and conditional expressions (1) to (3) below are preferably satisfied:

$$Np2 < Np1 \quad (1)$$

$$vp2 - vp1 > 20 \quad (2)$$

$$1 < |(F-D)/Rn| < 5 \quad (3)$$

wherein $Np1$ is a d-line refractive index of the meniscus lens;
$Np2$ is a d-line refractive index of the biconvex lens;
$vp1$ is an Abbe number of the meniscus lens;
$vp2$ is an Abbe number of the biconvex lens;
$F$ is a focal length of the positive lens group in the focusing optical system;
$D$ is a spacing between the biconvex lens and the negative lens; and
$Rn$ is a radius of curvature of the front-side surface of the negative lens.

The present invention affords an advantage in that it is possible to provide a compact optical scanning observation apparatus which has an internal focusing mechanism and which is suitable for in vivo examination of an animal.

DETAILED DESCRIPTION OF THE INVENTION

An optical scanning observation apparatus 1 according to an embodiment of the present invention will be described below with reference to FIGS. 1 to 4.

Figure 1:
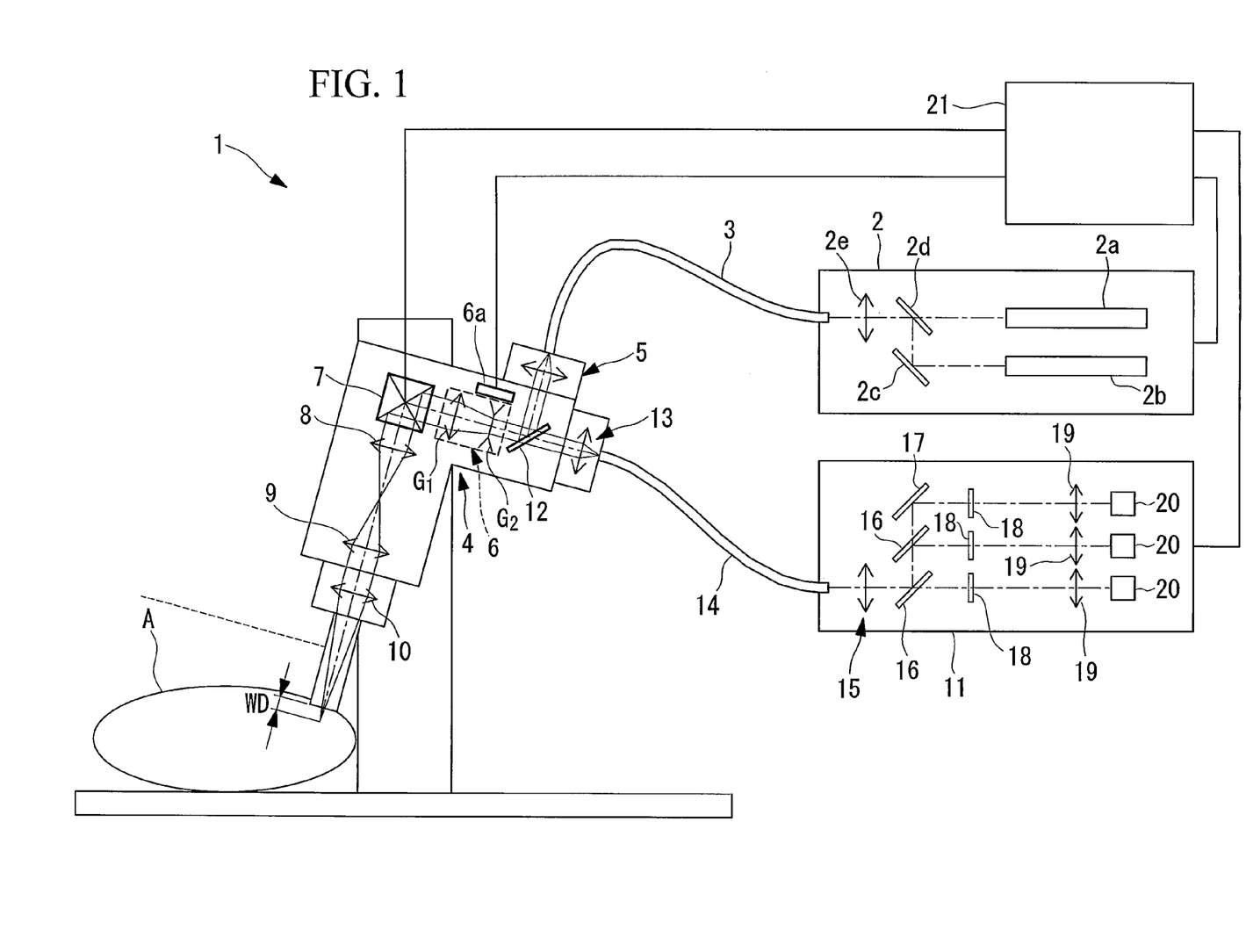
FIG. 1 is a diagram showing the overall configuration of an optical scanning observation apparatus according to a first embodiment of the present invention.

As shown in FIG. 1, the optical scanning observation apparatus 1 according to this embodiment includes a light source unit (light source) 2 for emitting laser light (illumination light), an optical fiber 3 for transmitting the laser light emitted from the light source unit 2, and an observation-apparatus main unit 4 for irradiating the sample A with the laser light transmitted by the optical fiber 3 and for collecting fluorescence generated at the sample A.

The observation-apparatus main unit 4 includes a collimator optical system 5 for converting the laser light transmitted by the optical fiber 3 into substantially collimated light; a focusing optical system 6 for adjusting the focus position of the laser light that is substantially collimated by the collimator optical system 5; a scanner (transverse-direction scanning device) 7 for two-dimensionally scanning the laser light; a pupil-projection optical system 8 for focusing the laser light scanned by the scanner 7 to form an intermediate image; an image-forming optical system 9 for collecting the laser light forming the intermediate image and converting it to substantially collimated light; an objective optical system 10 for focusing the substantially collimated laser light to irradiate the sample A, as well as for collecting fluorescence returning from the sample A; and a detection optical system 11 for detecting the fluorescence collected by the objective optical system 10. Reference numeral 21 in the figure indicates a control unit and a monitor. The control unit controls the positions of the light source unit 2, the focusing optical system 6, the scanner 7, and the observation-apparatus main unit 4, and the monitor displays the image acquired by the detection optical system 11.

The light source unit 2 includes, for example, a plurality of laser light sources 2a and 2b for generating a plurality of types of laser light, a mirror 2c and dichroic mirror 2d for combining the laser light emitted from these laser light sources 2a and 2b onto the same light path, and a coupling optical system 2e for focusing the laser light onto an end face of the optical fiber 3.

Figure 2:
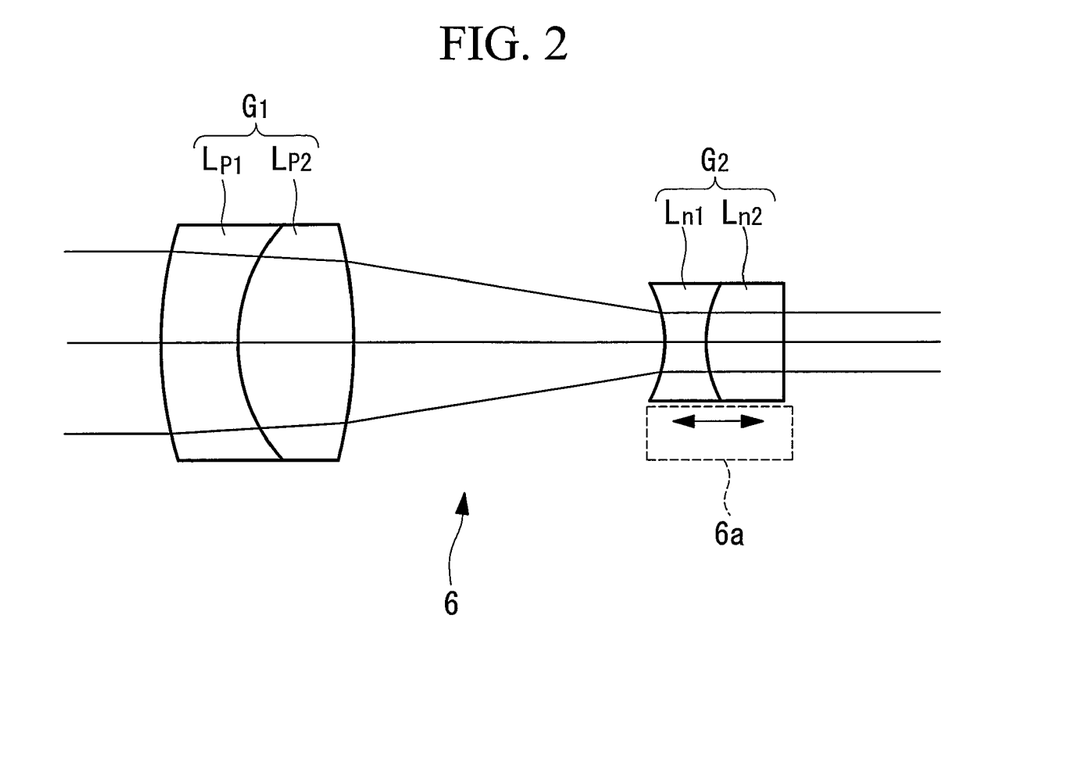
FIG. 2 is a diagram showing details of a focusing optical system provided in the optical scanning observation apparatus in FIG. 1.

As shown in FIG. 2, the focusing optical system 6 is formed of a positive lens group $G_1$ and a negative lens group $G_2$ and also includes a lens driving device 6a for driving the negative lens group $G_2$ in the optical-axis direction. The lens driving device 6a is formed of any type of linear motion mechanism. The working distance WD is changed by operating the lens driving device 6a to move the negative lens group $G_2$ in the optical-axis direction, thus making it possible to align the focal plane of the objective optical system 10 with an arbitrary position in the depth direction inside the sample A.

The scanner 7 is formed of a so-called proximity galvanometer mirror in which, for example, two galvanometer mirrors that are supported so as to be rotatable about two mutually orthogonal directions are disposed in close proximity to each other.

The detection optical system 11 includes a dichroic mirror 12 for splitting off, from the laser light, the fluorescence generated at the sample A and returning via the objective optical system 10, the image-forming optical system 9, the pupil-projection optical system 8, the scanner 7, and the focusing optical system 6; a coupling optical system (detection-light focusing optical system, coupling lens) 13 for focusing the fluorescence split off by the dichroic mirror 12; an optical fiber 14 for transmitting the fluorescence focused by the coupling optical system 13; a collimator optical system 15 for converting the fluorescence transmitted via the optical fiber 14 into substantially collimated light; dichroic mirrors 16 and a mirror 17 for dividing the substantially collimated fluorescence into each wavelength; barrier filters 18 for blocking any laser light contained in the fluorescence; focusing lenses 19 for focusing the fluorescence passing through the barrier filters 18; and a plurality of light detectors 20 for detecting the focused fluorescence at each wavelength.

Figure 3:
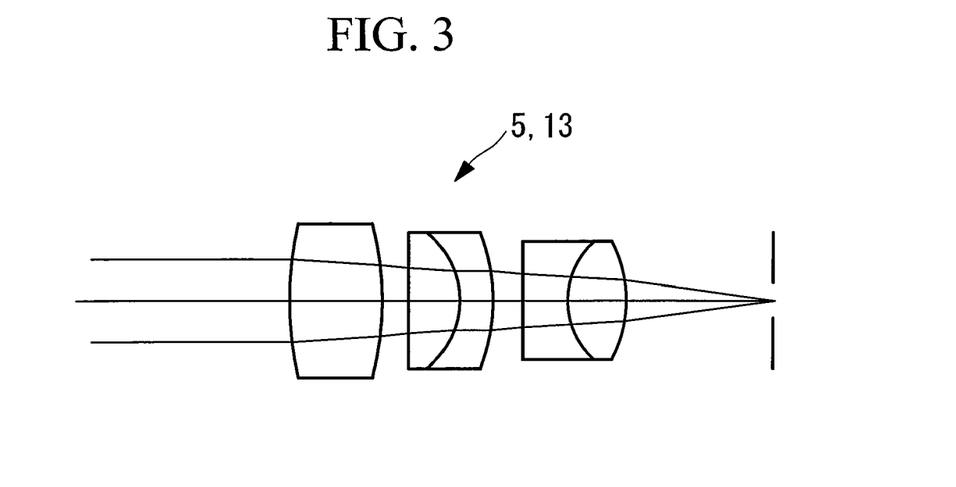
FIG. 3 is a diagram showing details of a collimator optical system and a coupling optical system provided in the optical scanning observation apparatus in FIG. 1.

The collimator optical system 5 and the coupling optical system 13 are formed, for example, of lens groups like that shown in FIG. 3.

Now, the focusing optical system 6 will be described in more detail with reference to FIG. 2.

In the focusing optical system 6, the sample A side is defined as the front side, and the light source unit 2 side is defined as the back side.

The focusing optical system 6 is formed of the positive lens group $G_1$ and the negative lens group $G_2$, as described above. As shown in FIG. 2, the positive lens group $G_1$ is formed of a combined meniscus lens $L_{p1}$ and a biconvex lens $L_{p2}$. The negative lens group $G_2$ is formed of a combined biconcave lens $L_{n1}$ and a meniscus lens $L_{n2}$.

The positive lens group $G_1$ is disposed closer to the front than the negative lens group $G_2$.

The positive lens group $G_1$ is disposed so that the front focal point thereof is substantially coincident with the position of the scanner 7.

The negative lens group $G_2$ is driven in the optical axis direction by the lens driving device 6a close to a position where the entire focusing optical system 6 forms an afocal optical system (in other words, the back focal point of the positive lens group $G_1$ and the front focal point of the negative lens group $G_2$ are coincident).

With this configuration, the laser light that is substantially collimated by the collimator optical system 5 is incident from the back side of the negative lens group $G_2$ and emerges as a diverging beam. The exiting light from the negative lens group $G_2$ is refracted by the positive lens group $G_1$.

The divergence angle (or the convergence angle) of the laser light emerging from the positive lens group $G_1$ varies according to the distance between the positive lens group $G_1$ and the negative lens group $G_2$. When the back focal point of the positive lens group $G_1$ and the front focal point of the negative lens group $G_2$ are coincident, the focusing optical system 6 becomes an afocal optical system, and the laser light emerging from the positive lens group $G_1$ is thus substantially collimated.

When the positive lens group $G_1$ and the negative lens group $G_2$ are closer than the positions where they form an afocal optical system, the laser light emerging from the positive lens group $G_1$ becomes a diverging beam, and the focal position of the objective optical system 10 is thus located deeper in the sample A.

When the positive lens group $G_1$ and the negative lens group $G_2$ become more distant than the positions where they form an afocal optical system, the laser light emerging from the positive lens group $G_1$ becomes a converging beam and is thus focused at a shallower position in the sample A. Therefore, it is possible to perform observation at any position from a deep position to a shallow position in the sample A merely by changing the position of the negative lens group $G_2$ in the optical-axis direction.

In a conventional focusing optical system, two positive lens groups are provided, and the light is temporarily focused inside the focusing optical system. In this embodiment, however, it is not necessary to focus the light inside the focusing optical system 6. As a result, it is possible to reduce the length of the focusing optical system 6 to about half of the length in the conventional case.

The working distance at the tip of the objective optical system 10 is changed by moving the negative lens group $G_2$ of the focusing optical system 6 in the optical-axis direction by means of the lens driving device 6a. The relationship between positions of the lens groups $G_1$ and $G_2$ in the focusing optical system 6 and the observation position in the sample A is as shown in Equation (1). (The back side is the positive direction. $Z_{ob}$, $\Delta$, $\delta$, and d, are defined with reference to the positions where the focusing optical system 6 forms an afocal optical system.)

$$Z_{ob} = n \times (\delta - \Delta) \times F_a^2 / \{F_{fc1}^2 - (\delta - \Delta)(d - \Delta)\} \qquad (1)$$

Here, $Z_{ob}$ is the focus position inside the sample;

$\Delta$ is the position of the lens group (positive lens group $G_1$ in this embodiment) at the front side of the focusing optical system (closer to the transverse-direction scanning device);

$\delta$ is the position of the lens group (the negative lens group $G_2$ in this embodiment) at the back side of the focusing optical system (farther from the transverse-direction scanning device);

n is the refractive index of the sample;

$F_a$ is the focal length of overall optical system between the sample and the focusing optical system;

$F_{fc1}$ is the focal length of the lens group in the focusing optical system that is closer to the transverse-direction scanning device; and d is the coordinate of the front focal point of the lens group at the front side (transverse-direction scanning device side) of the focusing optical system when the focal point at the front side (focusing optical system side) of the overall optical system between the sample and the focusing optical system is defined as a reference.

When the second term in the denominator in Equation (1) is not so large in comparison with $F_{fc1}$, Equation (1) can be approximated by Equation (2), wherein the relationship between the amount of driving of the negative lens group $G_2$ and the amount of change in the working distance WD is substantially linear.

$$Z_{ob} = n \times (\delta - \Delta) \times F_a^2 / F_{fcl}^2 \quad (2)$$

In this embodiment, because the objective optical system 10, the image-forming optical system 9, and the pupil-projection optical system 8 exist between the sample A and the scanner 7, Fa is given by Equation (3), and Equation (2) can be rewritten as Equation (4).

$$F_a = F_{ob} \times F_{p1} / F_{t1} \quad (3)$$

$$Z_{ob} = n \times (\delta - \Delta) \times (F_{ob}/F_{t1})^2 \times (F_{p1}/F_{fcl})^2 \quad (4)$$

Here, $F_{ob}$ is the focal length of the objective optical system;

$F_{t1}$ is the focal length of the image-forming optical system; and $F_{p1}$ is the focal length of the pupil-projection optical system.

Figure 4:
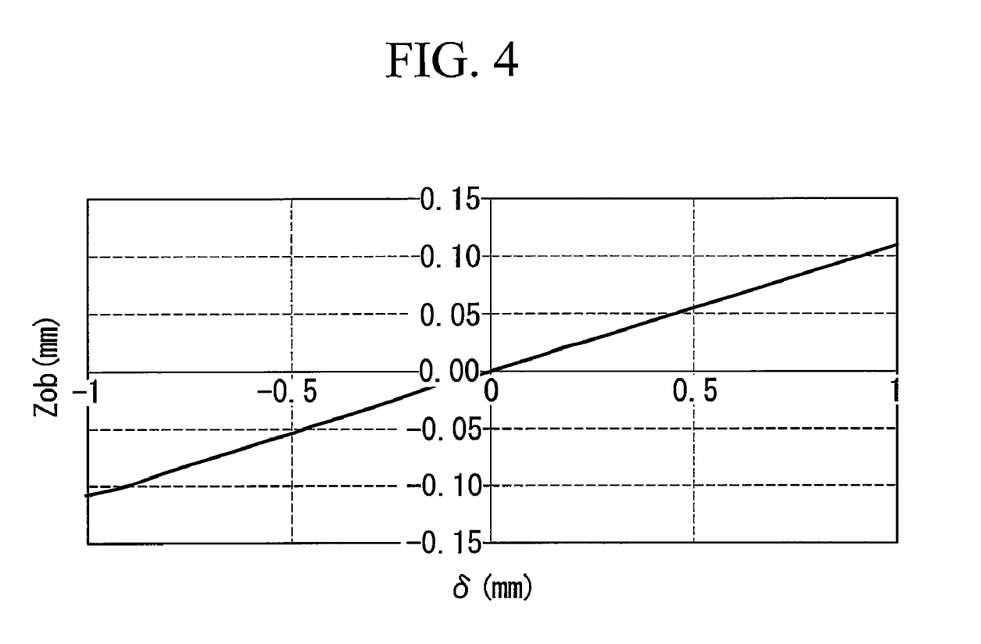
FIG. 4 is a graph showing the relationship between the position of a lens group at the back side of the focusing optical system in FIG. 2 and the focus position at the sample.

As an example, with $F_{ob}$=18 mm, $F_{t1}$=50 mm, $F_{fcl}$=15 mm, and n=1.33, then $Z_{ob}$ is shown in FIG. 4 when only the negative lens group $G_2$ is driven.

Conditions A to D shown below are possible examples of the conditions for increasing the linearity.

A: It is preferable to use the focusing optical system 6 in a state close to an afocal optical system. In a state close to an afocal optical system, since the second term (δ-Δ) in the denominator in Equation (1) does not take a particularly large value in comparison with $F_{fcl}$, the second term in the denominator in Equation (1) becomes small, and the linearity between the amount of driving of the negative lens group $G_2$ and the amount of change in the working distance WD increases.

B: It is preferable that the front focal point of the lens group at the front side (the scanner 7 side) in the focusing optical system 6 be close to the scanner 7.

The objective optical system 10 in the microscope is changed to match the application. Normally, however, the back focal point of the overall optical system between the sample A and the scanner 7 (in this embodiment, the optical system including the objective optical system 10, the image-forming optical system 9, and the pupil-projection optical system 8) is close to the scanner 7 (with this arrangement, the change in magnification is small even if the focus position changes). Therefore, when the front focal point of the lens group (in this embodiment, the positive lens group $G_1$) at the front side of the focusing optical system 6 is close to the scanner 7, d in Equation (1) becomes small for many objective optical systems 10, and the linearity between the amount of driving of the negative lens group $G_2$ and the amount of change in the working distance WD thus increases.

C: To realize condition B, it is preferable to arrange the positive lens group $G_1$ at the front side of the focusing optical system 6 (the side closer to the scanner 7) and the negative lens group $G_2$ at the back side thereof (the side further from the scanner 7) in the stated order.

Except for special cases, with this arrangement, d in Equation (1) can be made small because the front focal point of the positive lens group $G_1$ is actually on the scanner 7 side of the positive lens group $G_1$, and the front focal point of the negative lens group $G_2$ is actually on the optical fiber 3 side of the negative lens group $G_2$.

D: Usually, sufficient linearity can be obtained with conditions A to C; however, when even higher linearity is required, in addition to the above, it is possible to drive only the lens group at the back side (the negative lens group $G_2$), but not the lens group at the front side (the positive lens group $G_1$). Thus, d and A in Equation (1) become zero, and therefore, the amount of driving of the lens group at the back side (the negative lens group $G_2$) and the amount of change in the working distance WD exhibit a perfectly linear relationship.

Next, conditions for making the overall observation apparatus 1 even more compact will be described.

The absolute value of the focal length of the positive lens group $G_1$ is preferably larger than the absolute value of the focal length of the negative lens group $G_2$. Accordingly, because the beam diameter at the back side is smaller than the focusing optical system 6, it is possible to reduce the focal lengths of the coupling optical system 13 and the collimator optical system 5, which allows the observation-apparatus main body 4 to be reduced in size.

The conditions under which the focusing optical system 6 exhibits its function (aberration correction) are as follows.

Taking the scanner 7 side as the front side of the focusing optical system 6, preferably, the positive lens group $G_1$ is a lens in which a meniscus lens $L_{p1}$ having a convex surface at the front side is combined with a biconvex lens $L_{p2}$, and the lens at the front-most side of the negative lens group $G_2$ is a negative lens Ln1 with a concave surface facing the front side, and conditional expressions (5) to (7) below are satisfied.

$$Np2 < Np1 \quad (5)$$

$$vp2 - vp1 > 20 \quad (6)$$

$$1 < |(F-D)/Rn| < 5 \quad (7)$$

Here,

Np1 is the d-line refractive index of the meniscus lens $L_{p1}$;

Np2 is the d-line refractive index of the biconvex lens $L_{p2}$;

vp1 is the Abbe number of the meniscus lens $L_{p1}$;

vp2 is the Abbe number of the biconvex lens $L_{p2}$;

F is the focal length of the positive lens group in the focusing optical system;

D is the distance between the biconvex lens $L_{p2}$ and the negative lens $L_{n1}$; and Rn is the radius of curvature of the front surface of the negative lens $L_{n1}$.

The lens shape of the positive lens group $G_1$ and expressions (5) and (6) are conditions for reducing chromatic aberrations, and the surface shape of $L_{n1}$ and expression (6) are conditions for reducing the spherical aberrations.

Next, an Example of the optical scanning observation apparatus 1 according to this embodiment will be described.

The focal length of the positive lens group $G_1$ is 15 mm, the focal length of the negative lens group $G_2$ is −5 mm, the front focal position of the positive lens group $G_1$ is −13.4 mm (in other words, the optimum distance from the scanner 7 is 13.4 mm), and the overall length (when an afocal optical system is formed) is 15.9 mm.

Lens data of the focusing optical system 6 when an afocal optical system is formed is shown in Table 1.

TABLE 1

| SURFACE NUMBER | R | D | nd | vd |
|---|---|---|---|---|
| 1 | 11.102 | 2.02 | 1.51633 | 64.14 |
| 2 | 4.3767 | 3 | 1.43875 | 94.93 |
| 3 | −10.4155 | 7.9262 | | |
| 4 | −2.8344 | 1 | 1.51633 | 64.14 |
| 5 | 5.1211 | 2 | 1.603 | 65.44 |
| 6 | 21.1386 | | | |

In Table 1, surface numbers are assigned from the left side in Table 2 (the scanner 7 side). R in Table 1 is the radius of curvature (mm), D is the surface spacing (mm), nd is the refractive index at the d-line, and vd is the Abbe number at the d-line.

The working distance at the sample side is changed by changing the spacing of Surface 3.

An example of the collimator optical system 5 and the coupling optical system 13 in the detection optical system 11 is shown in FIG. 3. Lens data for the coupling optical system 13 and the collimator optical system 5 is shown in Table 2 for the case where these optical systems have focal lengths of 5 mm and numerical apertures of 0.15.

TABLE 2

| SURFACE NUMBER | R | D | nd | vd |
|---|---|---|---|---|
| 1 | 6.926 | 1.75 | 1.43875 | 94.93 |
| 2 | −6.926 | 0.5 | | |
| 3 | ∞ | 1 | 1.48749 | 70.23 |
| 4 | −1.717 | 0.61 | 1.741 | 52.64 |
| 5 | −4.602 | 0.57 | | |
| 6 | ∞ | 0.8 | 1.51633 | 64.14 |
| 7 | 1.392 | 1.22 | 1.43875 | 94.93 |
| 8 | −2.339 | 2.7564 | | |
| 9 | END FACE OF FIBER | | | |

The performance when combining the focusing optical system 6 of FIG. 2 and Table 1 with the coupling optical system 13 of FIG. 3 and Table 2 is shown in Table 3. Table 3 shows values for when the focusing optical system 6 forms an afocal optical system.

As a result, it is found that the optical scanning observation apparatus 1 according to this embodiment has extremely high optical performance.

TABLE 3

| WAVELENGTH (nm) | WAVEFRONT ABERRATION RMS (λ) | CHROMATIC ABERRATION (mm) |
|---|---|---|
| 435.84 | 0.0011 | 0.0013 |
| 486.13 | 0.0016 | 0.0003 |
| 546.07 | 0.0019 | 0.0001 |
| 587.56 | 0.0021 | 0 |
| 656.27 | 0.0022 | −0.0003 |
| 768.19 | 0.002 | −0.0019 |

In this embodiment, the lens driving device 6a may be attached to the positive lens group $G_1$ to drive the positive lens group $G_1$, or the lens driving device 6a may be attached to both the positive lens group $G_1$ and the negative lens group $G_2$ to change the relative distance between the two lens groups $G_1$ and $G_2$.

Figure 5:
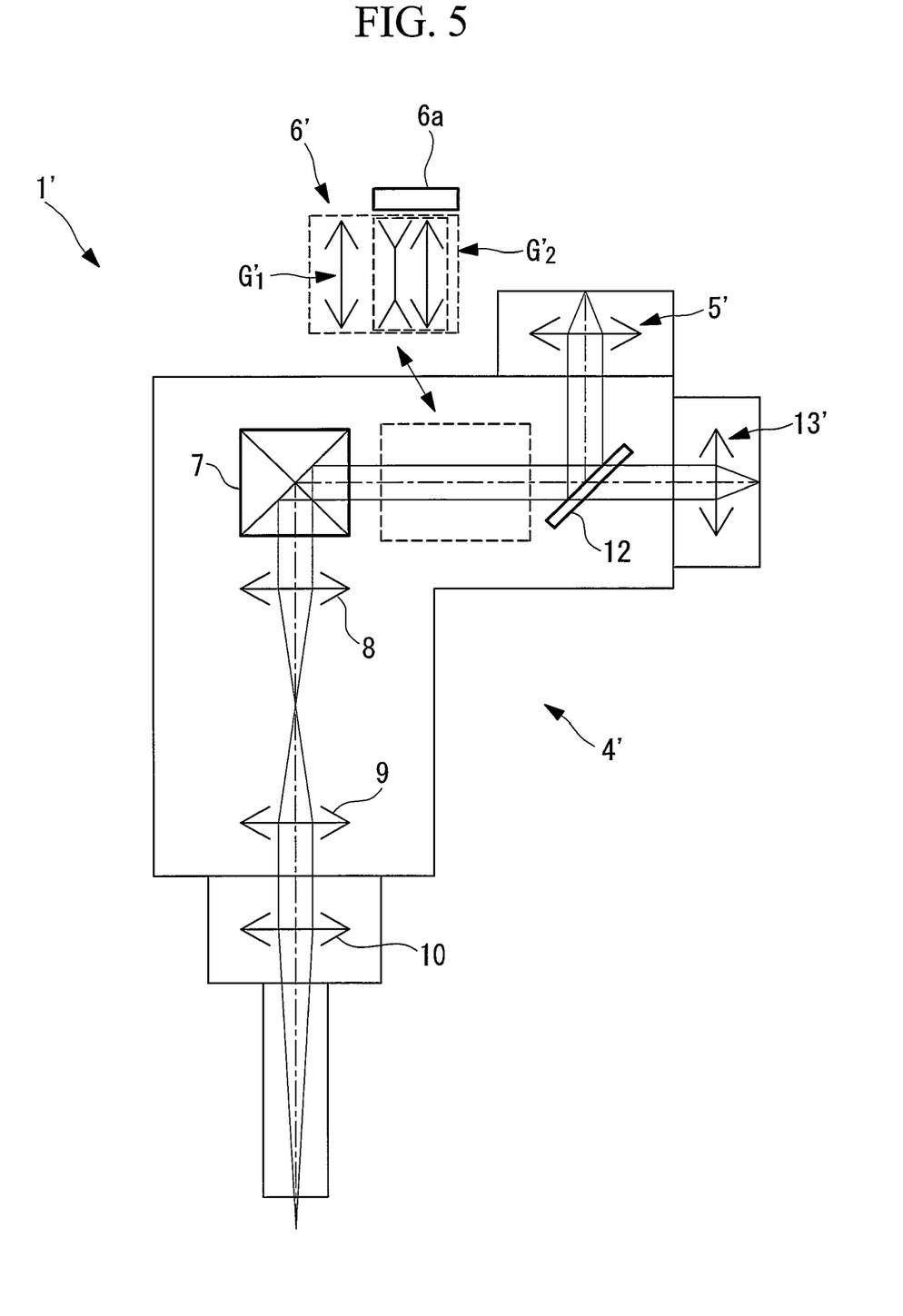
FIG. 5 is a diagram showing a microscope main unit in an optical scanning observation apparatus according to a second embodiment of the present invention.

Next, an optical scanning observation apparatus 1' according to a second embodiment of the present invention will be described with reference to FIG. 5.

In the description of the optical scanning observation apparatus 1' according to this embodiment, parts that have the same configuration as those in the optical scanning observation apparatus 1 according to the first embodiment described above are assigned the same reference numerals, and a description thereof is omitted here.

As shown in FIGS. 5 to 8, the differences between an observation-apparatus main unit 4' of the optical scanning observation apparatus 1' according to this embodiment and that of the first embodiment are a focusing optical system 6', a collimator optical system 5', and a coupling optical system 13'.

Figure 6:
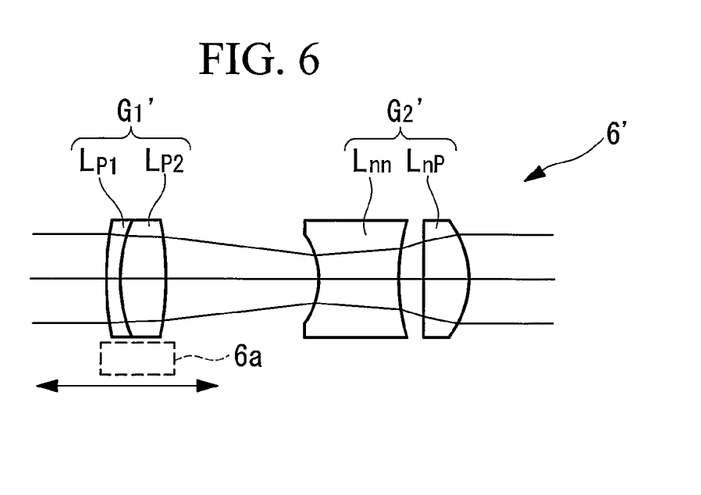
FIG. 6 is a diagram showing details of a focusing optical system provided in the optical scanning observation apparatus in FIG. 5.

In this embodiment, the focusing optical system 6' can be inserted in and removed from the light path and is formed of a positive lens group $G_1$' and a negative lens group $G_2$'. The negative lens group $G_2$' is formed of a high-power negative lens $L_{nn}$ and a low-power positive lens $L_{np}$, in this from the positive lens group $G_1$'.

The positive lens group $G_1$' is positioned closer to the front side than the negative lens group $G_2$'.

The positive lens group $G_1$' is positioned so that the front focal point thereof is substantially coincident with the position of the scanner 7.

The positive lens group $G_1$' is moved in the optical-axis direction by the lens driving device 6a to change the working distance at the tip of the objective optical system 10.

The absolute values of the focal lengths of the positive lens group $G_1$' and the negative lens group $G_2$' are substantially the same.

With the optical scanning observation apparatus 1' according to this embodiment, having the above configuration, because the absolute values of the focal lengths of the positive lens group $G_1$' and the negative lens group $G_2$' are substantially the same, at lens positions forming an afocal optical system, the magnification is substantially unity. This indicates that the beam diameters at the front and back of the focusing optical system 6' are substantially the same. In other words, because the change in beam diameter is small even when the focusing optical system 6' is inserted and removed, it is possible to reduce the change in intensity of the laser light and the fluorescence when the focusing optical system 6' is inserted and removed.

Using the focusing optical system 6' (unity-magnification afocal optical system) of this embodiment also affords and advantage in that it is possible to easily convert a laser-scanning microscope having no internal focus adjusting mechanism to a microscope that can change the working distance. This conversion can be achieved simply by inserting a unit containing the focusing optical system 6' of this embodiment between the scanner 7 and the dichroic mirror 12 of a laser-scanning microscope having no internal focus adjusting mechanism.

Figure 7:
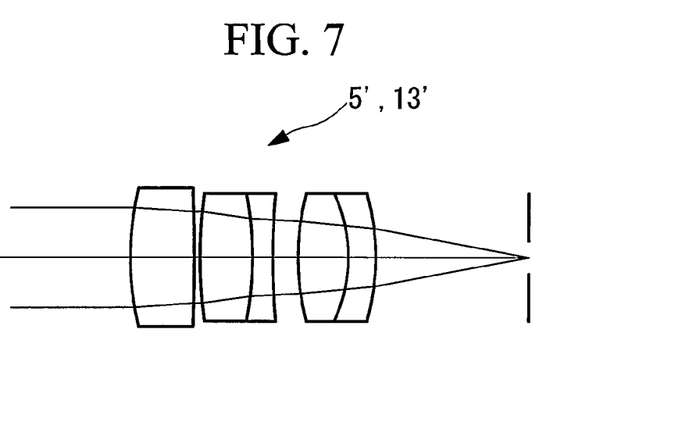
FIG. 7 is a diagram showing details of a collimator optical system and a coupling optical system provided in the optical scanning observation apparatus in FIG. 5.

The reason it can be used without changing the coupling optical system 13', the collimator optical system 5', or any other optical system is because the beam diameters are substantially the same at the front and back of the focusing optical system 6'.

Conversely, when the absolute values of the focal lengths of the positive lens group and the negative lens group are different, the beam diameters at the front and back of the focusing optical system 6' change, and it is thus necessary to change the design of the coupling optical system 13', the collimator optical system 5', and other optical systems. Therefore, the conversion becomes more difficult.

Here, a method of aligning the lenses such that the absolute values of the focal lengths of the positive lens group $G_1$' and the negative lens group $G_2$' are substantially the same and so that the lenses can be driven close to the positions where they form an afocal optical system without interfering with each other will be described.

In the focusing optical system 6', the negative lens group $G_2$' is formed of the high-power negative lens $L_{nn}$ and the low-power positive lens $L_{np}$, in this order from the front side (close to the positive lens group $G_1$'). By doing so, the front principal point of the negative lens group $G_2$' is extended towards the outside from the negative lens $L_{nn}$. Therefore, the front principal point of the negative lens group $G_2$' and the back principal point of the positive lens $L_{np}$ can be made coincident, thus forming an afocal optical system. Accordingly, the lenses can be driven without interfering with each other.

Next, an Example of the optical scanning observation apparatus 1' according to this embodiment will be described.

The focal length of the positive lens group $G_1'$ is 24 mm, the focal length of the negative lens group $G_2'$ is −24 mm, the front focal position of the positive lens group $G_1'$ is −22.4 mm (in other words, the optimum distance from the scanner 7 is 22.4 mm), the overall length (when an afocal optical system is formed) is 23.5 mm, the focal length of the negative lens $L_{nn}$ constituting the negative lens group $G_2'$ is −3.84 mm, and the focal length of the positive lens $L_{np}$ is 11.32 mm.

Lens data of the focusing optical system 6' when an afocal optical system is formed is shown in Table 4.

TABLE 4

| SURFACE NUMBER | R | D | nd | vd |
|---|---|---|---|---|
| 1 | 21.960 | 1 | 1.48749 | 70.23 |
| 2 | 8.394 | 2.75 | 1.43875 | 94.93 |
| 3 | −16.575 | 9.94 | | |
| 4 | −3.937 | 5.155 | 1.603 | 65.44 |
| 5 | 8.394 | 1.7 | | |
| 6 | ∞ | 3 | 1.43875 | 94.93 |
| 7 | −4.966 | | | |

An example of the collimator optical system 5' and the coupling optical system 13' in the detection optical system 11 is shown in FIG. 7. Lens data of the coupling optical system 13' and the collimator optical system 5' is shown in Table 5 for the case where these optical systems have focal lengths of 15 mm and numerical apertures of 0.16.

TABLE 5

| SURFACE NUMBER | R | D | nd | vd |
|---|---|---|---|---|
| 1 | 12.918 | 3.41 | 1.43875 | 94.93 |
| 2 | −38.744 | 0.3 | | |
| 3 | 19.745 | 2.87 | 1.43875 | 94.93 |
| 4 | −10.484 | 1.02 | 1.741 | 52.64 |
| 5 | 30.929 | 1.41 | | |
| 6 | 10.612 | 2.72 | 1.43875 | 94.93 |
| 7 | −7.379 | 1.51 | 1.48749 | 70.23 |
| 8 | −16.304 | 8.5031 | | |
| 9 | END FACE OF FIBER | | | |

The performance when the focusing optical system 6' of FIG. 6 and Table 4 is combined with the collimator optical system 5' and the coupling optical system 13' of FIG. 7 and Table 5 is shown in Table 6. Table 6 shows values for when the focusing optical system 6' forms an afocal optical system.

From these results, it is found that the optical scanning observation apparatus 1' according to this embodiment has extremely high optical performance (wavefront aberration RMS value and on-axis chromatic aberrations).

TABLE 6

| WAVELENGTH (nm) | WAVEFRONT ABERRATION RMS (λ) | CHROMATIC ABERRATION (mm) |
|---|---|---|
| 435.84 | 0.0038 | 0.0017 |
| 486.13 | 0.0028 | 0.0004 |
| 546.07 | 0.0021 | 0.0004 |
| 587.56 | 0.0018 | 0 |
| 656.27 | 0.0014 | 0.0007 |
| 768.19 | 0.0011 | 0.0012 |

Figure 8:
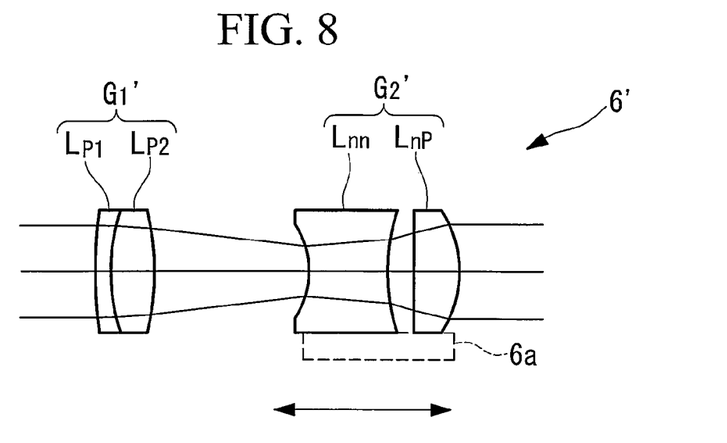
FIG. 8 is a diagram showing a modification of the focusing optical system in FIG. 6.

In this embodiment, the lens driving device 6a may be attached to the entire negative lens group $G_2'$ to drive it, as shown in FIG. 8, or it may drive the two lens groups $G_1'$ and $G_2'$ independently.

What is claimed is:

1. An optical scanning observation apparatus comprising:
   a light source configured to emit illumination light for illuminating a sample;
   an objective optical system configured to focus illumination light from the light source onto the sample;
   a detection-light splitting device configured to split off, from the illumination light, detection light emitted from the sample and collected by the objective optical system;
   a detection-light focusing optical system configured to focus the detection light split off by the detection-light splitting device;
   a detector configured to detect the detection light focused by the detection-light focusing optical system;
   a focus scanning device configured to be capable of being inserted and removed, disposed between the detection-light splitting device and the objective optical system, and
   a transverse-direction scanning device disposed between the focus scanning device and the objective optical system and configured to scan the illumination light from the light source on the sample in substantially orthogonal directions with respect to an optical axis,
   wherein the focus scanning device includes a focusing optical system formed of at least a positive lens group and a negative lens group, and a lens driving device configured to move at least one lens group included in the focusing optical system in the optical-axis direction to change a working distance of the objective optical system,
   wherein the positive lens group and the negative lens group are driven close to a positional relationship in which the overall focusing optical system forms an afocal optical system, and
   wherein absolute values of focal lengths of the positive lens group and the negative lens group are substantially the same.

2. An optical scanning observation apparatus comprising:
   a light source configured to emit illumination light for illuminating a sample;
   an objective optical system configured to focus illumination light from the light source onto the sample;
   a detection-light splitting device configured to split off, from the illumination light, detection light emitted from the sample and collected by the objective optical system;
   a detection-light focusing optical system configured to focus the detection light split off by the detection-light splitting device;
   a detector configured to detect the detection light focused by the detection-light focusing optical system;
   a focus scanning device disposed between the detection-light splitting device and the objective optical system; and
   a transverse-direction scanning device disposed between the focus scanning device and the objective optical system and configured to scan the illumination light from the light source on the sample in substantially orthogonal directions with respect to an optical axis,
   wherein the focus scanning device includes a focusing optical system formed of at least a positive lens group and a negative lens group, and a lens driving device configured to move at least the lens group included in the focusing optical system in the optical-axis direction to change a working distance of the objective optical system, wherein the positive lens group and the negative lens group are driven close to a positional relationship in which the overall focusing optical system forms an afocal optical system, wherein absolute values of focal lengths of the positive lens group and the negative lens group are substantially the same, wherein the negative lens group includes, from a side closer to the positive lens group, a negative lens subgroup and a positive lens subgroup having lower power than the negative lens subgroup;

wherein the positive lens group is a lens combining a meniscus lens having a convex surface at the front side and a biconvex lens, and wherein a front-most lens of the negative lens group is a negative lens having a concave surface facing the front side.

3. An optical scanning observation apparatus comprising:

a light source configured to emit illumination light for illuminating a sample;

an objective optical system configured to focus illumination light from the light source onto the sample;

a detection-light splitting device configured to split off, from the illumination light, detection light emitted from the sample and collected by the objective optical system;

a detection-light focusing optical system configured to focus the detection light split off by the detection-light splitting device;

a detector configured to detect the detection light focused by the detection-light focusing optical system;

a focus scanning device disposed between the detection-light splitting device and the objective optical system; and a transverse-direction scanning device disposed between the focus scanning device and the objective optical system and configured to scan the illumination light from the light source on the sample in substantially orthogonal directions with respect to an optical axis, wherein the focus scanning device includes a focusing optical system formed of at least a positive lens group and a negative lens group, and a lens driving device configured to move at least one lens group included in the focusing optical system in the optical-axis direction to change a working distance of the objective optical system, wherein the positive lens group and the negative lens group are driven close to a positional relationship in which the overall focusing optical system forms an afocal optical system, and wherein, when the transverse-direction scanning device side of the focusing optical system is defined as a front side, the positive lens group is a lens combining a meniscus lens having a convex surface at the front side and a biconvex lens; a front-most lens of the negative lens group is a negative lens having a concave surface facing the front side; and conditional expressions (1) to (3) below are satisfied:

$$Np2 < Np1 \quad (1)$$

$$vp2 - vp1 > 20 \quad (2)$$

$$1 < |(F-D)/Rn| < 5 \quad (3)$$

wherein $Np1$ is a d-line refractive index of the meniscus lens;

$Np2$ is a d-line refractive index of the biconvex lens;

$vp1$ is an Abbe number of the meniscus lens;

$vp2$ is an Abbe number of the biconvex lens;

F is afocal length of the positive lens group in the focusing optical system;

D is a spacing between the biconvex lens and the negative lens: and

Rn is a radius of curvature of the front-side surface of the negative lens.

* * * * *